May 16, 1939.  J. C. WHITE  2,158,809
HEAT EXCHANGER
Filed March 3, 193  2 Sheets-Sheet 2

Inventor:
John C. White,
By Wilson, Dowell, McCanna & Foley Attys.

Patented May 16, 1939

2,158,809

UNITED STATES PATENT OFFICE 2,158,809

HEAT EXCHANGER

John C. White, Madison, Wis.

Application March 3, 1937, Serial No. 128,719

4 Claims. (Cl. 257—2)

This invention pertains to improvements in continuous flow heat transfer methods and apparatus.

The invention is herein illustrated by describing its use in a continuous flow milk pasteurizer. In this embodiment an injector is used for propelling the water through the pasteurizer and for simultaneously heating the water. Among the various operating requirements encountered is the necessity of holding the temperature of the stream of milk within a very narrow range. For example, when pasteurizing milk at 144° F., good practice requires that the attained temperature of the milk shall not vary more than about 2° plus or minus. This close regulation must be maintained despite pressure variations in steam supply and temperature variations in the water supply and the milk supply.

Another problem encountered is that at times the milk supply will vary considerably in pressure and sometimes entirely cease so quickly that unless the water temperature and flow, or both, be sufficiently diminished simultaneously, the milk still in the pasteurizer may become overheated.

Hence the broad object of this invention is to make provision for controlling both the temperature and the rate of flow of the water in accordance with the temperature of the effluent milk and the rate of flow of the milk to insure that the milk emerging from the apparatus will be heated uniformly to a desired temperature.

A further object of the invention is to embody the control and operating mechanism in an inexpensive construction of utmost simplicity without sacrifice of flexibility or reliability.

Other objects and advantages of the invention will be alluded to hereinafter.

Referring to the drawings:

Fig. 4 is a sectional view of the thermostatic mechanism shown in elevation in Fig. 2.

Figure 1:
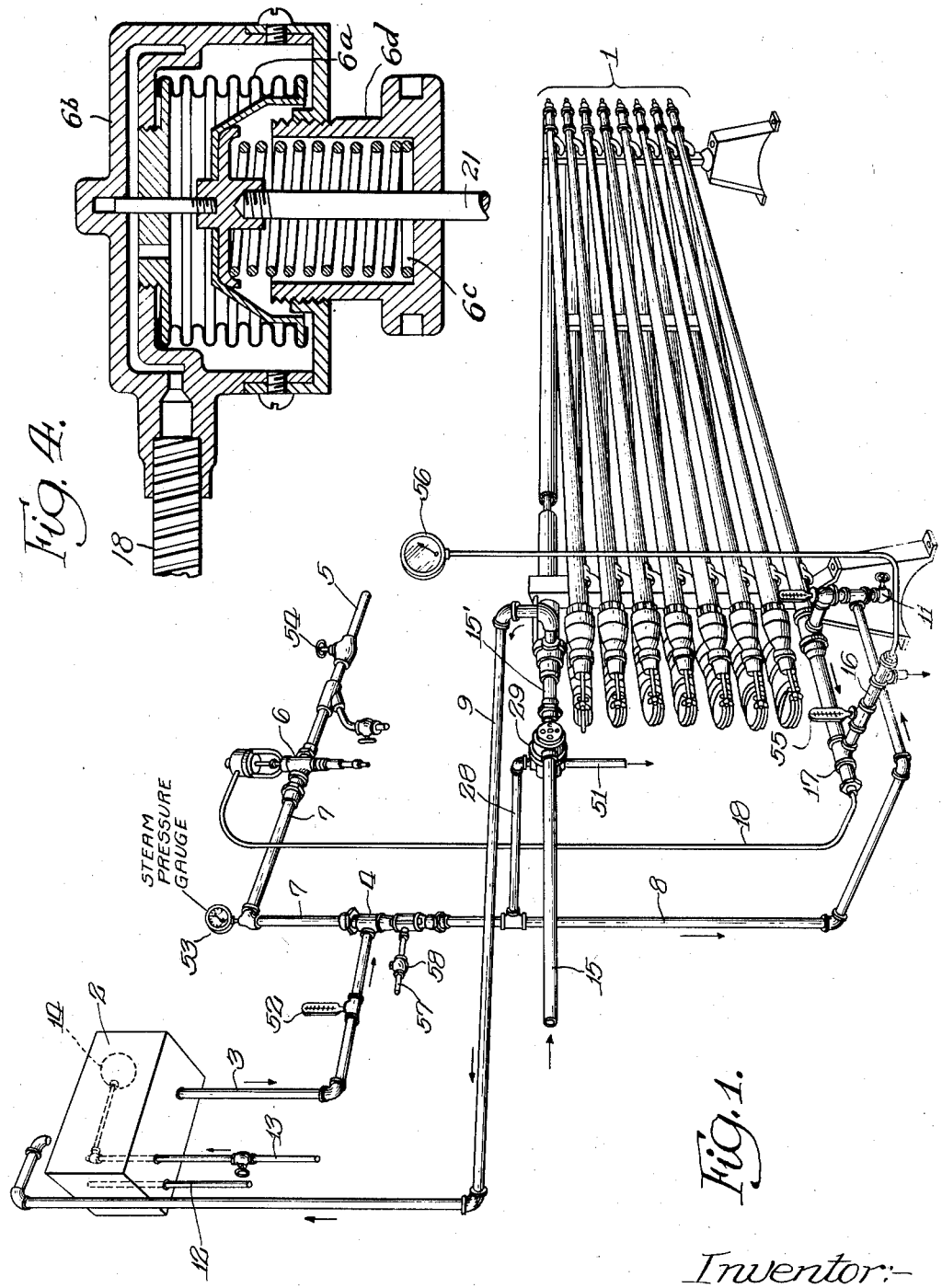
Fig. 1 is a perspective view of a pasteurizing apparatus embodying this invention.
Figure 2:
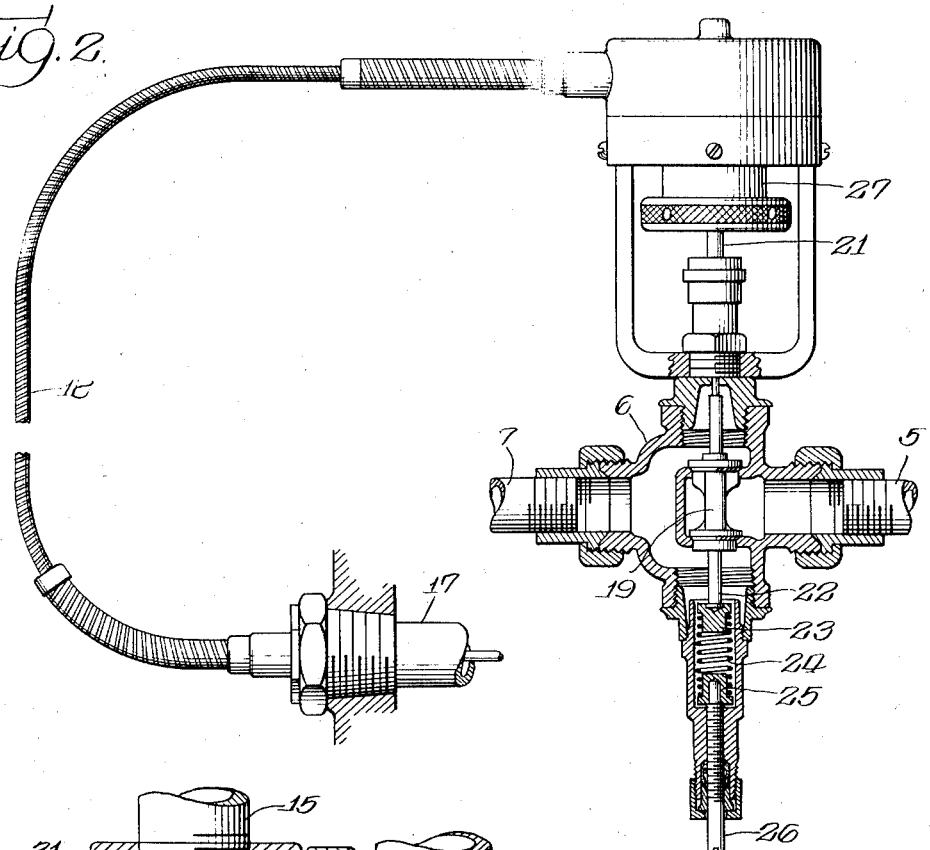
Fig. 2 is an enlarged detail view of the thermostatically controlled steam valve.

Referring further to the drawings, the coils, generally indicated at 1, are constructed in accordance with the well known type of double pipe counterflow pasteurizing apparatus. The outer pipes shown in the drawings conduct the flowing stream of water, while a smaller pipe carried within each outside pipe conducts the stream of milk to be pasteurized. The details of construction of such a system of coils are too well known in this art to require further description herein.

A storage tank 2 positioned higher than the heat exchange coils of the pasteurizer affords a substantially constant head of water for supplying the injector. A pipe 3 is connected with an injector generally designated as 4, which may be of any well known design for injectors utilizing either live steam or exhaust steam. I prefer, however, to use an injector such as is shown in my Patent No. 2,066,867, dated January 5, 1937, for Injector heaters.

A steam supply line 5 carrying either live or exhaust steam, as may be desired, is provided with a thermostatically controlled valve, generally indicated as 6, for regulating the flow of steam through the pipe 7 to the injector 4 which heats and simultaneously propels the water through pipe 8 into the pasteurizing coils. The water emerges from the coils into the pipe 9 and flows back into the storage tank 2. A valve 11 may be used to drain the water from the coils, when desired. An overflow pipe 12 will take care of any excessive amount of water which may accumulate in the storage tank, while a cold water inlet pipe 13, having a valve controlled by the float 14, will supply additional water to the tank as needed.

The milk to be pasteurized enters the pasteurizer through the pipe 15, propelled by gravity or a pump, flows through the successive coils, and finally emerges through the pipe 15. For the sake of illustrating the invention only a few coils are shown, but it should be understood that any number of coils may be used. In a casing 17 located in the pipe 16 is a thermostatic element connected by a tube 18 with the bellows in the valve 6, the expansion or contraction of the volatile liquid contained in this element serving to expand or contract the bellows and thereby decrease or increase the opening of the valve itself. As shown in Fig. 4, the bellows 6a located in the casing 6b is biased toward contracted position by the spring 6c, the force of which may be regulated by the adjustable hollow cap 6d. The details of construction of the bellows and valve do not form a part of this invention, except to the extent that they cooperate with an attachment which I provide for modifying the movement of the valve.

The double-seating valve 19 has its stem 21 connected with the bellows, while a lower extension 22 of the stem is connected with or rides upon a spring pressed plunger 23 seated on a spring 24 whose lower end is carried on an adjustable spring pilot 25. By means of a threaded rod 26 connected with the pilot, the latter may be adjusted vertically to vary the compression of the spring 24 which resists the seating and aids the unseating of the valve. Normally the bellows, generally indicated as 27, will expand against the action of a spring 6c contained in or connected therewith, a uniform amount for each degree of temperature increase of the volatile liquid in the thermostatic element, hence, in the absence of the attachment, the valve would close with uniform speed as the temperature increases. The attachment connected with the bottom of the valve will, through the compression of the auxiliary spring 24, provide added resistance to the action of the bellows just before valve closure and thereby prevent an abrupt cutting off of the steam supply and also give a more prompt recovery when the temperature drop calls for more steam.

Figure 3:
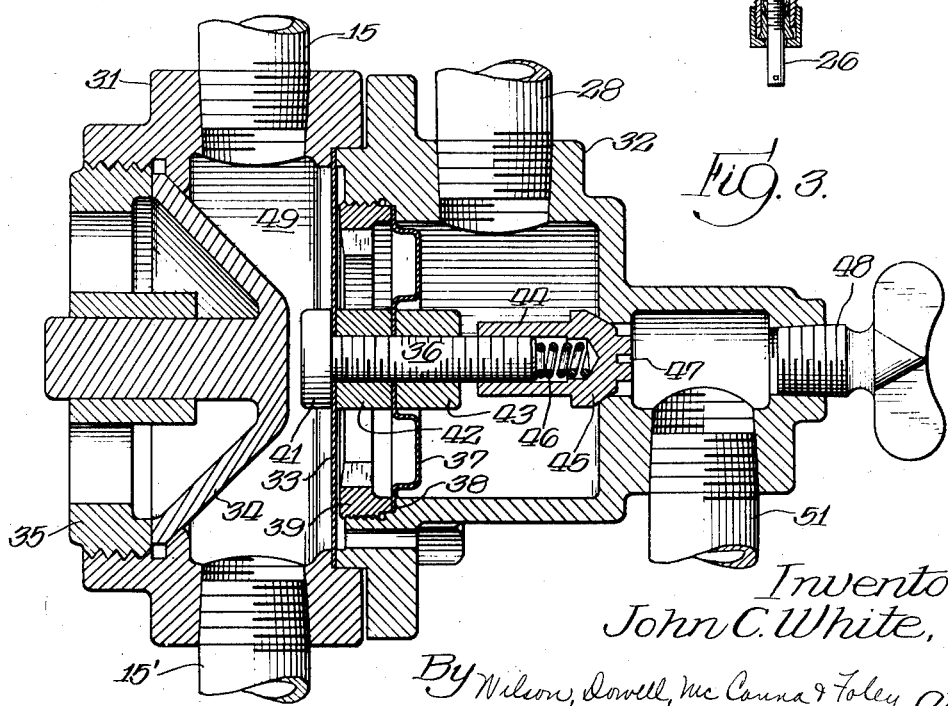
Fig. 3 is an enlarged sectional view of a pressure controlled by-pass valve.

In the commercial operation of a pasteurizer the flow of milk is frequently reduced or even temporarily cut off because of operating conditions arising out of the functioning of other associated apparatus. When such diminution of flow takes place, it is important to instantly reduce the rate of flow of water through the coils in order that the milk still remaining in the coils, or flowing therethrough at a reduced rate, will not be heated excessively. I provide, therefore, a by-pass pipe 28 connected with a diaphragm actuated valve, generally indicated as 29, and shown in Fig. 3. This valve consists of two casings 31 and 32 bolted or otherwise secured together, clamping between them a diaphragm 33. Fig. 3 shows, for ease of illustration, the casing 32 positioned at 90° from the position it actually occupies in Fig. 1, so that the milk pipes and water pipes may be shown parallel. An imperforate gate 34 held in position by a clamping nut 35 serves to close the open side of the casing 31 and at the same time acts as a bumper against which the diaphragm post 36 may strike should the water pressure become excessive. The casing 32 also contains another diaphragm 37 having a smaller surface area than the diaphragm 33, the latter being clamped against the shoulder 38 of the casing by means of a nut 39. Both diaphragms are rigidly connected with the post 36 by the coaction of the head 41 of the post and a pair of clamping nuts 42 and 43. The post is threaded into the hollow stem 44 of the valve 45, a spring 46 serving to prevent accidental rotation of the valve relatively to the post. By means of a kerf 47 provided in the outer end of the valve one can adjust the valve relatively to the post upon removal of the plug 48.

The valve 29 operates as follows: Milk enters the chamber 49 through the pipe 15 and emerges through the pipe 15', and when the normal pressure range of the milk is being maintained during regular operation, the milk pressure on the diaphragm 33 will keep the valve 45 seated. The water entering the other casing through the pipe 28 will be unable to pass the valve 45 unless the milk pressure drops below a predetermined pressure, whereupon the valve 45 will be unseated by the water pressure and the water may then escape through the pipe 51 to a drain or other suitable place of disposal. The by-passing of the water through this valve will reduce the rate of flow of the heated water through the pasteurizing coils, which is, of course, desirable whenever the rate of flow of milk has diminished.

By properly adjusting the valve and proportioning the amount of water to be by-passed under the different possible drops in the milk pressure in any given installation, the operator can thus provide that just enough water will be circulated through the coils to properly pasteurize the amount of milk flowing therethrough. Of course, at such a time when the rate of flow is being diminished the thermostatically operated valve 6 will continue to function to assist in maintaining the proper temperature of the water to accomplish the desired pasteurization.

A thermometer 52 placed in the pipe 3 will constantly inform the operator of the temperature of the water flowing from the supply tank, while a pressure gauge 53 will indicate the prevailing steam pressure in the line 7. A stop valve 54 is provided for shutting off steam supply when necessary. A thermometer 55 in the outflowing milk line will show the temperature of the pasteurized milk and a recording thermometer 56 should also be provided to keep a record of the pasteurization.

The apparatus above described makes possible the automatic control of the temperature of the effluent milk within one degree of variation, if necessary, despite variations in the pressure of the steam supply and despite variations in both the temperature and pressure of the milk supply. Of course, it should be recognized that the pasteurizing temperatures above stated have been selected merely for illustrative purposes and that other temperatures may be attained and maintained by this apparatus.

To start the operation of the apparatus, steam is turned on until the injector is free of water and then partly closed off until the injector picks up and starts from the head of water in the float tank, after which the steam valve 54 may be further opened until the steam gauge shows the desired pressure. The overflow which occurs when the injector is being started is disposed of through the pipe 57. A swing check valve 58 will prevent the injector from sucking in air through the pipe 57 when the injector is operating. The discharge pressure from the injector should then be so adjusted that there is no waste at the by-pass valve. The water should be circulated through the pasteurizer a few moments to warm it up before starting the milk flow. This will also warm the water in the float tank, and when the water temperature shown on the thermometer at the entrance to the pasteurizer attains and maintains the desired pasteurizing temperature, the milk flow may be started and final adjustments of temperature and pressure may be made. When these are completed the controller will assume the burden and automatically maintain the desired temperature of the effluent milk under normal conditions.

When the supply of milk, either furnished by gravity from a tank or by means of a pump, diminishes below a predetermined pressure, the by-pass valve 29 will open and divert part of the heated water and, together with the steam valve 6, will maintain the proper pasteurizing temperature even if the milk coils are then draining by gravity.

Since the milk enters at the top of the pasteurizing coils, it may be drained therefrom by gravity or may be drained by the suction of a pump. However, if the direction of flow of the milk were from bottom to top, the apparatus would, nevertheless, perform the functions of the invention in proportioning the amount of water flow to the amount of milk flow if the latter were variable.

The illustrated embodiment above described has been used merely for demonstrating the nature of the invention. It is obvious that the invention is susceptible of considerable modification and may be embodied in forms differing from the illustrated structure without departing, however, from the spirit and scope of the invention defined in the claims which follow.

Having shown and described my invention, I claim:

1. In a continuous flow heat exchange apparatus for heating a stream of liquid by means of a heated stream of water, an injector utilizing steam for heating and propelling a stream of water through the apparatus, a valve for regulating the steam supplied to the injector thermostatically controlled by the temperature of said liquid emerging from the apparatus, and means controlled by the pressure of the liquid entering the apparatus for diverting at least a portion of the injected stream of water from the apparatus whenever said pressure drops below a predetermined amount.

2. In combination with a continuous counterflow heat exchange apparatus for heating a stream of liquid by means of a heated stream of water, said streams flowing in opposite directions in concentric pipes, an injector utilizing steam for heating and propelling water into said apparatus at the point of effluence of the heated liquid, means for regulating the supply of steam to the injector controlled by the temperature of the liquid as it emerges from the apparatus, and means controlled by the pressure of the liquid entering said apparatus for diverting from the apparatus at least a portion of water being injected thereinto whenever the pressure of the incoming liquid falls below a predetermined amount.

3. In a continuous flow heat exchange apparatus for heating a stream of liquid by means of a heated stream of water, an injector utilizing steam for heating and propelling water through said apparatus, a valve for regulating the supply of steam to the injector controlled by the temperature of the liquid emerging from the apparatus, said valve being constructed and arranged to have a reduced rate of closure per degree of temperature change as the valve closely approaches its seat, and means controlled by the pressure of the liquid entering said apparatus for diverting from the apparatus at least a portion of the water being injected thereinto whenever the pressure of the incoming liquid falls below a predetermined amount.

4. In a continuous flow heat exchange apparatus for heating a stream of liquid by means of a heated stream of water, an injector utilizing steam for heating and propelling a stream of water through the apparatus, a valve for regulating the steam supplied to the injector thermostatically controlled by the temperature of said liquid emerging from the apparatus, means controlled by the pressure of the liquid entering the apparatus for diverting at least a portion of the injected stream of water from the apparatus whenever said pressure drops below a predetermined amount, and a water supply tank and means connecting the same with the injector and the water outlet of said apparatus for effecting recirculation of water through the tank and apparatus.

JOHN C. WHITE.